(12) United States Patent
Waris

(10) Patent No.: US 8,060,913 B2
(45) Date of Patent: Nov. 15, 2011

(54) POLICY EXECUTION

(75) Inventor: Heikki Waris, Helsinki (FI)

(73) Assignee: Nokia Corporation, Espoo (FI)

(*) Notice: Subject to any disclaimer, the term of this patent is extended or adjusted under 35 U.S.C. 154(b) by 1270 days.

(21) Appl. No.: 11/591,484

(22) Filed: Nov. 2, 2006

(65) Prior Publication Data
US 2008/0109868 A1 May 8, 2008

(51) Int. Cl.
*G06F 17/00* (2006.01)
*H04L 9/00* (2006.01)
*G06F 15/173* (2006.01)
*G06F 15/16* (2006.01)
*G06F 9/26* (2006.01)
G06F 21/24 (2006.01)
G06F 21/20 (2006.01)
H04W 8/18 (2009.01)
H04N 7/14 (2006.01)

(52) U.S. Cl. ............ 726/1; 713/182; 709/223; 709/224; 709/229; 711/203

(58) Field of Classification Search ...... 726/1; 713/182; 709/224, 229; 711/203
See application file for complete search history.

(56) References Cited

U.S. PATENT DOCUMENTS
5,899,994 A * 5/1999 Mohamed et al. ............ 711/203
2002/0166052 A1* 11/2002 Garg et al. .................... 713/182
2004/0218606 A1 11/2004 Leatherbury et al.
2006/0036730 A1* 2/2006 Graham et al. ............... 709/224
2006/0206615 A1* 9/2006 Zheng et al. .................. 709/229

FOREIGN PATENT DOCUMENTS
| CN | 1750459 | 3/2006 |
|---|---|---|
| EP | 1 589 781 A2 | 10/2005 |
| WO | WO 03/028313 A2 | 4/2003 |
| WO | WO 2004/008693 A1 | 1/2004 |
| WO | WO 2004/079492 A2 | 9/2004 |
| WO | WO 2005/064956 A1 | 7/2005 |
| WO | WO 2007067236 A1 * | 6/2007 |

OTHER PUBLICATIONS

Aris M. Ouksel, Doug Lundquist; "Demand-driven publish/subscribe in mobile environments"; Nov. 2010, Wireless Networks, vol. 16, Issue 8; Publisher: Kluwer Academic Publishers, pp. 2237-2261.*

International Search Report, PCT/EP2007/061674 filed Oct. 30, 2007.

* cited by examiner

*Primary Examiner* — Eleni Shiferaw
*Assistant Examiner* — Courtney D Fields
(74) *Attorney, Agent, or Firm* — Harrington & Smith

(57) ABSTRACT

According to one embodiment a method is disclosed involving storing in a device a static policy framework and one or more dynamic policy algorithms, and controlling policy management in the device by operating the static policy framework and executing the dynamic policy algorithms. The invention also provides in other embodiments an apparatus configured to perform such a method and a computer program product for performing the method.

34 Claims, 3 Drawing Sheets

POLICY EXECUTION

FIELD

The present invention relates to the control of policy management in devices, especially user equipment and communications devices, and most particularly to the control of policy management in telecommunications equipment.

BACKGROUND

Communication networks typically operate in accordance with a given standard or specification which sets out what the various elements of the network are permitted to do and how that should be achieved. For example, the standard may define whether the user or more precisely, user equipment is provided with a circuit switched service or a packet switched service. The standard may also define the communication protocols which shall be used for the connection. The given standard also defines one or more of the required connection parameters. The connection parameters may relate to various features of the connection. The parameters may define features such as the maximum number of traffic channels, quality of service and so on or features that relate to multislot transmission.

In other words, the standard defines the "rules" and parameters on which the communication within the communication system can be based. Examples of the different standards and/or specifications include, without limiting to these, specifications such as GSM (Global System for Mobile communications) or various GSM based systems (such as GPRS: General Packet Radio Service), AMPS (American Mobile Phone System), DAMPS (Digital AMPS), WCDMA (Wideband Code Division Multiple Access) or CDMA in UMTS (Code Division Multiple Access in Universal Mobile Telecommunications System) and so on.

The user equipment i.e. a terminal that is to be used for communication over a particular communication network has to be implemented in accordance with the predefined "rules" of the network. A terminal may also be arranged to be compatible with more than one standard or specification, i.e. the terminal may communicate in accordance with several different types of communication services. These user equipment are often called multi-mode terminals, the basic example thereof being a dual-mode mobile station.

It is important that in order to make such communication systems behave as required, the users and operators of the systems use a set of policies that specify how the system should respond to various situations. Policy may be considered to be a combination of rules and services where rules define the criteria for resource access and usage. Policy is required for certain services in order to define which services are supported and how they are supported.

Important functions in policy control are the configuration and management of the policies (e.g. typically via a human interface of the policy control mechanism), and the resolution and enforcement of the policies (e.g. typically via an automated part of the mechanism). The policy resolution and enforcement applies the configured policies by first receiving as an input a trigger event that initiates the resolution of a policy, and then sending as output instructions that enforce the outcome of the resolved policy action.

One example of policy control area is multi-access, i.e. where a multi-mode device has multiple interfaces, logical accesses and connected network domains over which it has connections and traffic flows. The device can have access over these multiple networks sequentially or simultaneously, and policies are needed to describe which connection is acceptable over which network, as well as whether it can or should be moved to a new network.

An example of policy resolution is when a trigger event such as a detection of an interface losing connectivity to a network causes the policy action of attempting detection of a new network with a different interface, joining the new network and then moving all traffic to it from the previous network. The policies involved in this task easily become very complicated, and multiple trigger events can be received during very short periods of time. The policy actions may also become available for sending as outputs at different times, because resolution of some consists of more steps and takes more time than for the others.

Additionally, policies may be created for very different purposes but nevertheless for the same device. For example, a mobile terminal may contain employer's policies that enforce a wide range of parameters in a strictly controlled fashion. But it can also contain policies defined by the employee for use during his leisure time, with lenient interpretation of only a few key parameters. And it may contain yet further policies defined by the provider of a software application running in the terminal, and being able to very exactly define the preferred values for a certain type of traffic. It would be desirable to use all these policies at the same time, but still keep the overall policy framework (including provisioning and configuration) easy to use and efficient to execute.

Known policy management methods may be platform specific due to the use of compilers producing executable binaries, or may not be available to end users, or may involve drastic resource consumption or delays during compilation, or may require rebooting of the device. In addition, policy syntax and formats that would allow detailed processing of versatile inputs are complex and heavy, and the same applies to interpreters using such policies. Policy control methods using lookups are limited to a few parameters or parameter values, or otherwise take a large amount of memory.

Accordingly, there is a need for an improved method of policy management in a user equipment, which provides high performance and versatile policy resolution but in which policies can be easily entered, configured or modified. Embodiments of the present invention aim to address one or more of the above-mentioned problems.

SUMMARY

Accordingly, in one embodiment the present invention provides a method (for example for controlling policy management in a user equipment) comprising storing in a device (e.g. a communication device or user equipment) a static policy framework and one or more (e.g. a plurality of) dynamic policy algorithms, and controlling policy management in the device by operating the static policy framework and executing one or more of the dynamic policy algorithms.

In a further embodiment, the present invention provides an apparatus (e.g. a device such as a user equipment) comprising a memory for storing a static policy framework and one or more dynamic policy algorithms, and a processor, wherein the processor is configured to control policy management in the apparatus by operating the static policy framework and executing one or more of the dynamic policy algorithms.

In a further embodiment, the present invention provides an apparatus (e.g. a device such as a user equipment) comprising a storage means for storing a static policy framework and a plurality of dynamic policy algorithms, and a policy management means for controlling policy management by operating the static policy framework and executing the dynamic policy algorithms.

In a further embodiment, the present invention provides a computer program product (for example a set of instructions or program code means stored on a computer-readable medium) which when executed on a processor in a device (for example a user equipment) causes the processor to operate a static policy framework and execute a plurality of dynamic policy algorithms for controlling policy management in the device.

In one embodiment the device or apparatus (e.g. user equipment) comprises a mobile terminal, more preferably a multi-access or multi-mode mobile terminal, e.g. a terminal which is capable of connecting to two or more different access networks. Thus one or more of the dynamic policy algorithms may be associated with a policy controlling connectivity of the user equipment to different networks, for instance in selecting an appropriate access mode for the terminal.

Each dynamic policy algorithm can be modified by two or more policy owners, for instance using an input means provided in the user equipment. The input means may comprise any suitable data input means, for instance a keyboard, selection device or text editor. The policy algorithms may be considered to be "dynamic" in the sense that they are capable of being changed, modified, entered or deleted by the policy owners.

Each dynamic policy algorithm can have a static set of inputs and a static set of outputs, for example a defined or controlled range of inputs and outputs which are considered to be compatible with the algorithm. The dynamic policy algorithms may be stored in memory as a structure of commands which operate on registers. The structure of the commands may be varied according to different embodiments of the present invention.

In one such embodiment, the structure comprises a table of values and an operation is performed on each input register in turn in a single pass. In a second embodiment, the structure comprises a list of commands, each command being preceded by a pointer to a register on which an operation is to be performed. In a third embodiment, which may be considered to be a hybrid of the first and second embodiments mentioned above, the structure comprises both a table structure and a list structure, and a toggling command switches a mode of operation of the algorithm between a table mode and a list mode.

Typically the input values for a dynamic policy algorithm to be executed are provided by the static policy framework, and are read to registers before execution of the dynamic policy algorithm. In some embodiments, the method may further comprise checking that the input values provided by the static policy framework are within a parameter range defined in a configured policy.

In a similar way, output values are preferably written from the registers to the static policy framework after execution of the dynamic policy algorithm. The method may comprise a further preferred step of checking that the output values to be written to the static policy framework are within a range defined in a configured policy.

In some embodiments each command comprises an argument field.

The static policy framework may typically comprise a plurality of specific policy algorithms for controlling policy management, e.g. static, non-modifiable algorithms designed for controlling defined policies.

In one embodiment, the processor of the user equipment operates an algorithm management function, which may comprise a step of checking that the dynamic policy algorithms stored or entered into the user equipment are compatible with the static policy framework. The algorithm management function may further operate to verify that the dynamic policy algorithms entered or stored in the user equipment were entered by an authorised policy creator. In another embodiment, the algorithm management function may operate to initiate storage of entered dynamic policy algorithms locally (e.g. within memory in the user equipment) or it may initiate transmission of the entered or stored dynamic policy algorithms to a remote device or location, for instance to a node within a telecommunications network to which the user equipment is connected.

In another embodiment, the processor is configured to operate an algorithm interpreter function for reading and executing the dynamic policy algorithms. Thus in some embodiments the dynamic policy algorithms may be executed using an interpreter. Embodiments of the invention may utilise an interpreter supporting relevant parts of a language such as Lua, APL, awk, or Scheme (with e.g. GNU Guile interpreter). Alternatively, the interpreter may interpret an assembly language (e.g. GNU Assembler or Netwide Assembler).

Embodiments of the present invention may split policies into a combination of dynamic and specific algorithms within a static policy framework. Each dynamic policy algorithm may have a static set of inputs and outputs that fit to its placement in the static policy framework, but the logic within the dynamic policy algorithm may be modifiable by various policy owners. Therefore, the same overall policy engine can be customized for a particular policy owner, or it can simultaneously support the divergent needs of multiple policy owners. The dynamic policy algorithms may be stored in memory as a structure of simple commands that operate on registers. The commands contain e.g. arithmetic and logical operations, and can be interpreted using an efficient dynamic algorithm interpreter function. The inputs of the algorithm may be stored into the registers before the algorithm execution, and the outputs can be read from the registers afterwards. The range of input and output values may be controlled. Embodiments of the invention may allow tailoring and very fast changing of policy contents while supporting high performance execution. There is no need for platform specific compilers, complex and heavy policy syntax and interpreters, or limitation of policy control to a few parameters.

Embodiments of the present invention may be an enhancement of current policy engines, especially for use in multi-access terminals, that complements a static and purpose specific, high performance policy framework with additional and more detailed dynamic algorithms for specific parts of functionality where it is likely that different policy owners may need to have different type of policy execution, or where different terminal models or variants may require easily upgradable policies. The static policy framework uses the dynamic algorithms as necessary, and may need to execute them very frequently (e.g. an algorithm may be evaluated inside an $O(N^3)$ loop).

The dynamic algorithms used in the present invention may resemble low level programming languages such as assembler and in certain embodiments can conveniently be written by proficient device or software vendors or system administrators. In preferred embodiments the end users of the device would at most need to choose the appropriate policy owner (unless chosen automatically by the device).

BRIEF DESCRIPTION OF THE DRAWINGS

The invention will now be described by way of example only with respect to the following specific embodiment, in which.

DETAILED DESCRIPTION OF EMBODIMENTS

Figure 1:
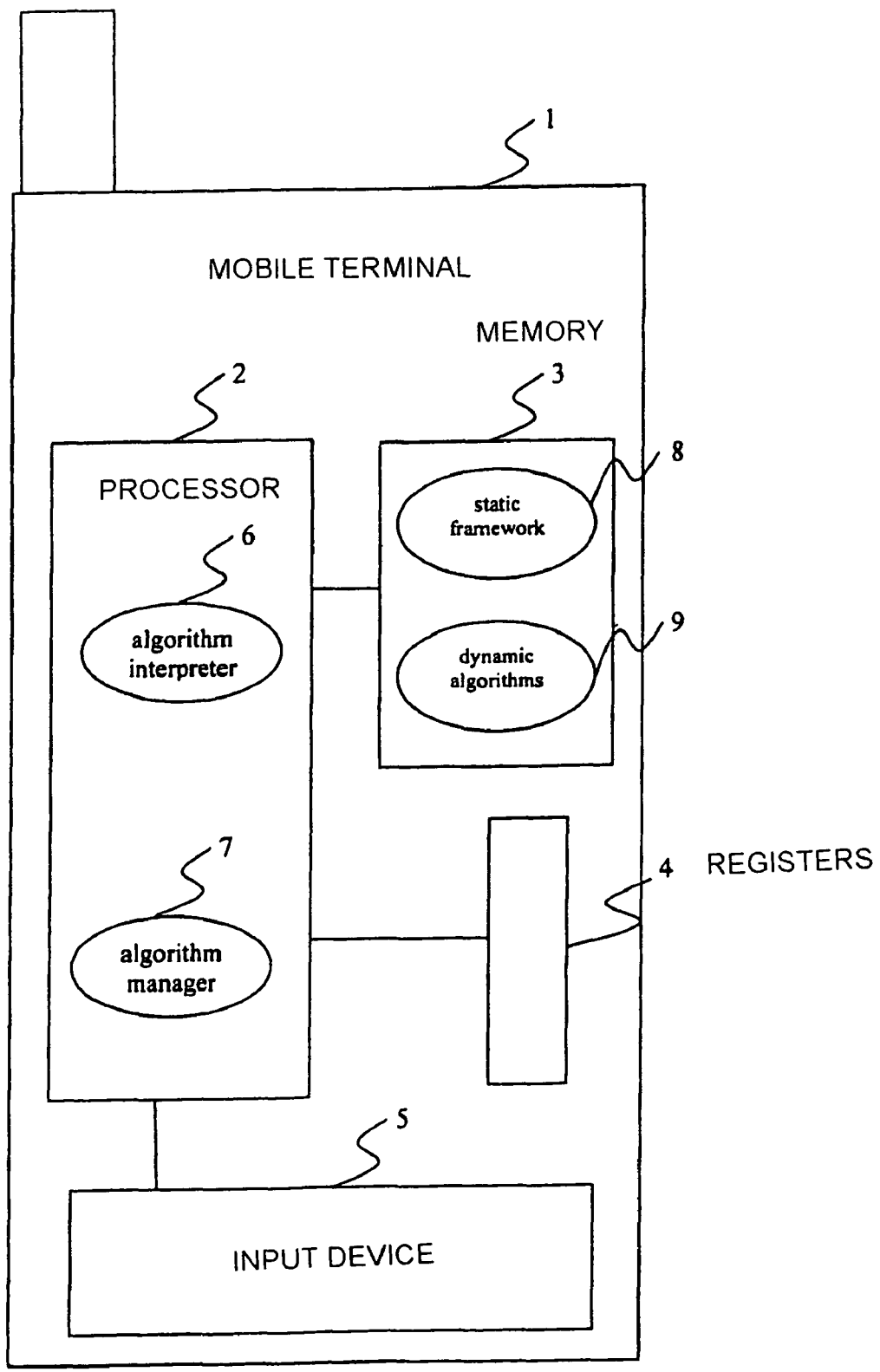
FIG. 1 shows a user equipment according to one embodiment of the present invention.

FIG. 1 shows a user equipment in the form of a multi-access mobile terminal 1 according to one embodiment of the present invention. Only selected features of the terminal 1 which are relevant for the present discussion are shown in FIG. 1. The terminal 1 comprises a processor 2, a memory 3, registers 4 and an input device 5.

The memory 3 stores a static policy framework 8 and a plurality of dynamic policy algorithms 9. The dynamic policy algorithms 9 stored in the memory may be modified using the input device 5, and further dynamic algorithms may also be entered into the terminal in a similar manner. The static policy framework 8 comprises a plurality of specific algorithms for controlling various aspects of policy management in the terminal 1. The specific algorithms of the static policy framework 8 are typically non-modifiable.

The processor 2 is configured to operate an algorithm management function 7 and an algorithm interpreter function 6. The operation of these functions is described below.

Policy management in the terminal 1 may be controlled by the processor 2 using the static policy framework 8 and the dynamic policy algorithms 9. The algorithm management function 7 knows the definitions for dynamic algorithms used by various policy engines in the terminal, including expected inputs and outputs. Various aspects of algorithm management may be performed by this function.

Figure 2:
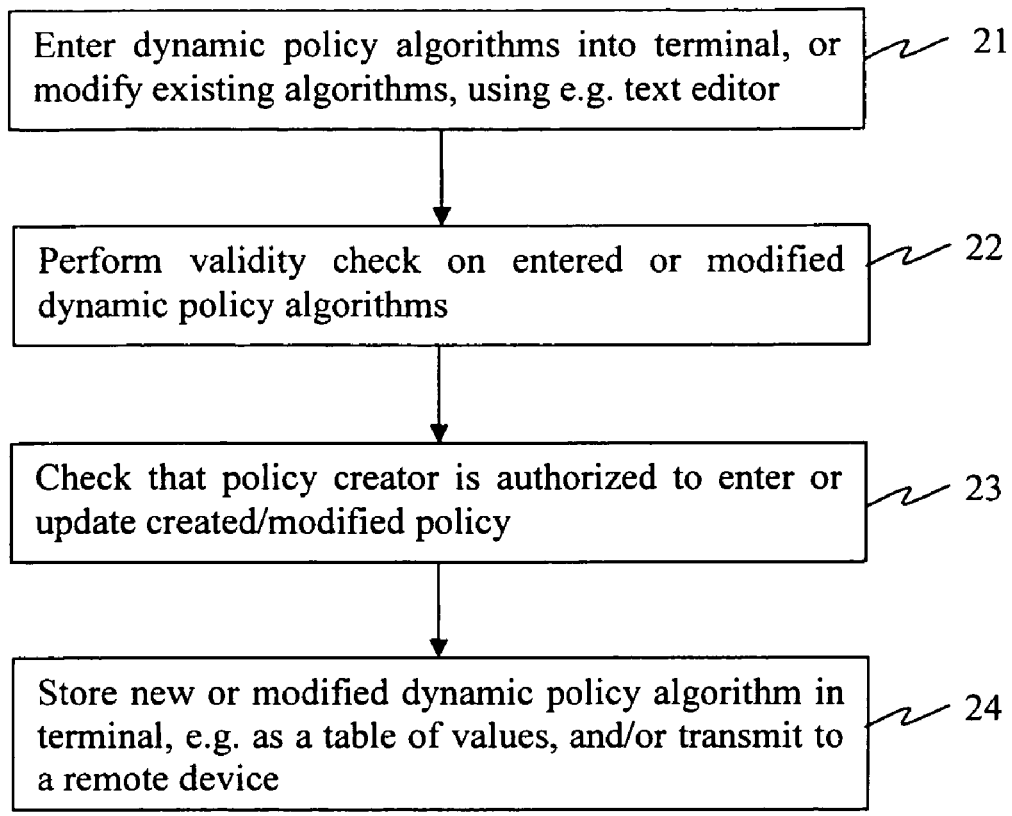
FIG. 2 shows aspects of dynamic policy algorithm creation and storage in a terminal according to one embodiment.

As shown in FIG. 2, in a first aspect the algorithm management function 7 controls the entry and configuration of dynamic policy algorithms in the terminal. Thus a policy creator may enter a new dynamic algorithm or modify an existing algorithm (see step 21 in FIG. 2) using the input device 5. This can be as simple as using a text editor, but it can also be a more complete translator that converts higher level syntax into the strictly defined syntax and commands defined in the invention. After this, the algorithm manager stores the dynamic algorithm as a table of values.

In another aspect, the algorithm management function 7 performs a validity check on entered or modified algorithms (see 22 in FIG. 2). This confirms that the policy contents uses valid commands and parameter ranges, and the inputs and outputs are as required by the policy framework that uses this dynamic algorithm. It also confirms that there is no division by zero or similar logical errors.

In another aspect, the algorithm management function 7 performs a policy configuration access control function (see 23 in FIG. 2). Prior to application of the policies, the manager checks that the policy creator is authorized to update this particular policy, possibly including a currently existing policy by another policy owner. The algorithm management function 7 may decide whether the policy creator is authorised to update the policy based, for example, on the use of a priority list or may derive the authorized policy owner information from terminal rights administrator settings.

In another aspect, the algorithm management function 7 initiates provisioning and storage of the dynamic algorithm to an appropriate policy engine in the terminal (see 24 in FIG. 2). This step can be set to take place at a certain time or upon a certain condition, such as change of device user or change of user profile. The policy can be stored directly locally, or provisioned to a remote device. The ready made policies are stored into memory starting from the given address (usable with a pointer).

Figure 3:
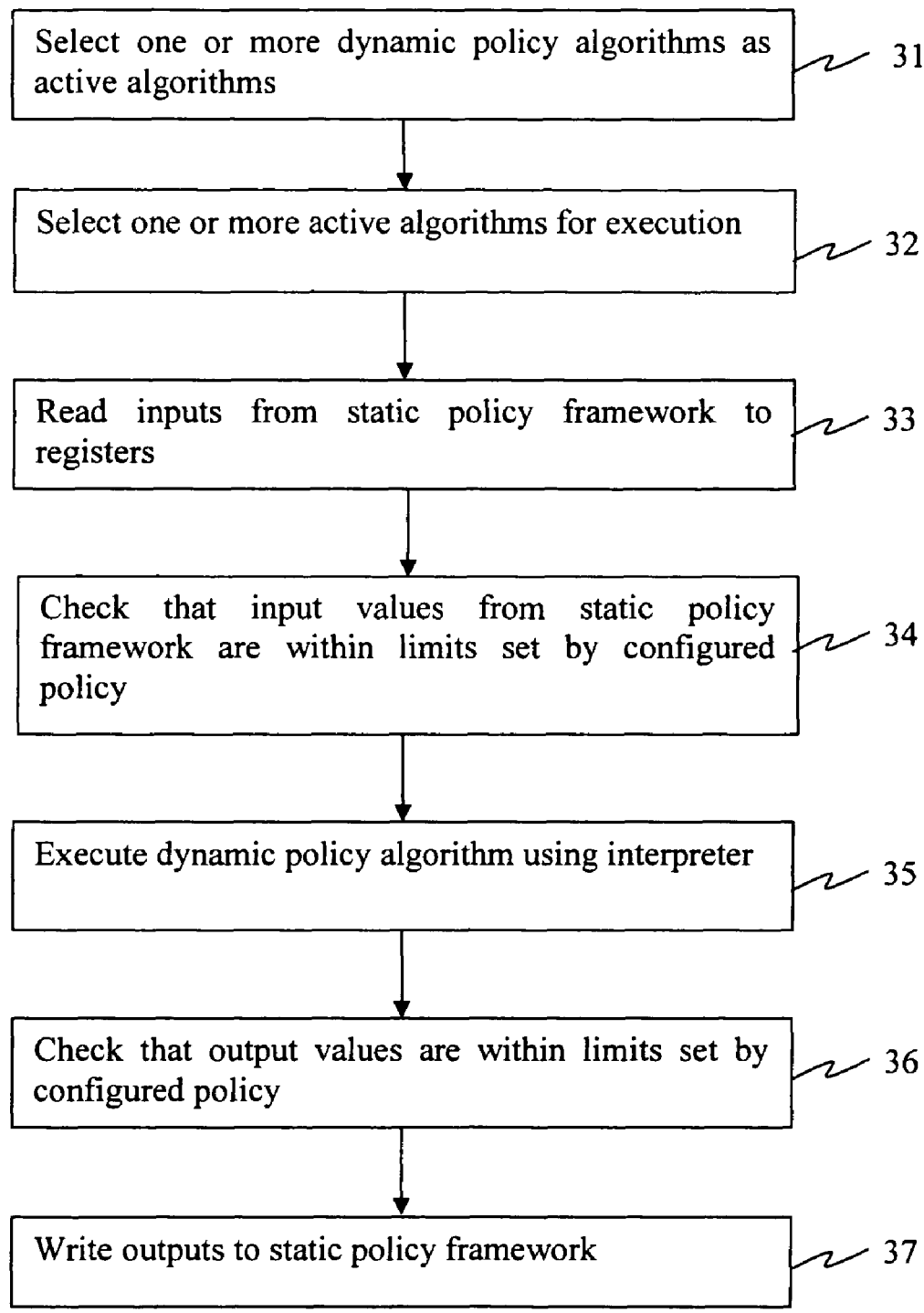
FIG. 3 shows aspects of dynamic policy algorithm execution according to one embodiment.

As an alternative to updating by replacing an existing dynamic policy algorithm, the algorithm management function 7 may select a dynamic policy algorithm that performs the same task (but differently, e.g. due to being created by different administrators) as the currently active dynamic algorithm (see 31 in FIG. 3), while still storing the other equivalent algorithms as inactive versions that can be activated as needed. In other embodiments multiple dynamic policy algorithms may be active simultaneously. The algorithm management function may select one of the active dynamic policy algorithms for execution (see 32 in FIG. 3) according to the user (or his/her administrator, or an application whose session the decision affects).

Before execution of the dynamic algorithms 9, inputs given by static policy framework 8 are read to the registers 4 (see 33 in FIG. 3), typically so that the dynamic algorithm interpretation (execution) function 6 is given a pointer to the registers 4 where the values are stored. The processor 2 performs a validity checking operation (see 34 in FIG. 3) such that the range of input values from the policy framework 8 is controlled so that they remain within the limits set in the configured policy (which was in turn validity checked based on the knowledge of the policy engine requirements for that particular algorithm). For this purpose, each input has associated minimum and maximum thresholds. Any value outside of this range is replaced with the threshold value.

Execution of the dynamic policy algorithms 9 is performed by the algorithm interpreter function 6 (see 35 in FIG. 3), operating on registers 4. The dynamic algorithm is stored in memory 3 as a structure of commands. The execution/interpreter function 6 reads and executes each command sequentially.

The structure can be a table where the execution function performs an operation on each input register in turn in one pass, and then makes a second pass starting with the first register again, and so on. This is useful for cases where some operations are applied in parallel (i.e. at the same time) to many sets of inputs, at least most of the time (e.g. the same ten operations to registers 1-3, 4-6, 7-9, and 10-12).

The structure can also be a list of individual commands that always refer to the register that is operated. In this case, each command is preceded with a pointer to (index of) such a register.

The structure can also be a hybrid, where a special command (or found by testing a masked command bit pattern with e.g. if (cmd & 0x30)==0x30) toggles the mode between a table based and a list based structure and execution.

The commands describe very simple and basic operations, including arithmetic and logical operations. For the purposes of fast execution, the commands are arranged into an order that can be narrowed down with binary operations. Each command also includes an argument field.

The highest bit describes the use of the argument field. For example:

0 means that the argument field is not used. The following bit 0 means that there is an argument of 0 or 1 to the operation, and 1 means that the currently processed register is used as argument;

1 means that the argument field is used. The following bit 0 means that the argument field is an argument to the operation, and 1 means that the argument field is a pointer to the register used as argument to the operation;

The following two bits mostly describe whether the second operand is the currently processed register (bits 10), or the additional (singular) memory register (bits 11). Other interpretations are also possible, depending on the values of the highest two bits.

The fifth bit describes whether the result of the operation is stored in the currently processed register (0) or the additional (singular) memory register (1).

The last three bits mostly describe the exact operation that the command describes.

Following execution of a dynamic algorithm, the outputs are written to the static policy framework 8 (see 37 in FIG. 3), typically by using the same registers 4 and pointer as with the inputs. There is similar validity checking (including minimum and maximum thresholds) before the outputs are written (see 36 in FIG. 3) as was after the inputs were read.

By way of specific example, the execution of an individual command can be done as shown in the following source code (in pseudocode) for an interpreter that takes as input an 8-bit operator (op) and an argument (arg). The interpreter also contains a temporary value register (mem) and a register set corresponding to the interpreted dynamic policy table (which initially stores the input values, and at the end the output values). This pseudocode is executed by the processor once per (op, arg) pair, i.e. N times for each dynamic policy table column and M times for each two dynamic policy table rows (assuming odd row is op, even row is arg). The variable ctr indicates the column on whose (op,arg) pair the interpreter is currently executing.

```
//DynAlg expression generation and execution loop
opb67=op&0xc0; opb45=op&0x30;
if        opb67==0xc0    expr2=reg[arg[ctr]];
else if   opb67==0x80    expr2=arg[ctr];
else if   opb67==0x40    expr2=reg[ctr];
else                     expr2=1;
if        opb67!=0x00 || op&0x1f==0x00 {
  if        opb45==0x30    expr1=mem;
  else if   opb45==0x20    expr1=reg[ctr];
  else if   opb45==0x10 {
    if        op&0x04==0x04    expr1=mem;
    else                       expr1=reg[ctr];
  }
  else {
    if        op&0x04==0x04    expr1=mem;
    else                       expr1=reg[ctr];
  }
}
if        opb67!=0x00 && op&0x20!=0x20 {
  switch    (op&0x07) {
    case 0:       expr0=expr1*expr2; break;
    case 2:       expr0=expr1/expr2; break;
    case 3:       expr0=expr1%expr2; break;
    case 4:       expr0=expr1&expr2; break;
    case 5:       expr0=expr1|expr2; break;
    case 6:       expr0=expr1^expr2; break;
  }
  if        op&0x08==0x08    mem=expr0;
  else                       reg[ctr]=expr0;
}
else {
  if        opb45==0x10 {
    switch    (op&0x03) {
      case 0:       expr0=expr1+expr2; break;
      case 1:       expr0=expr1-expr2; break;
      case 2:       expr0=expr1<<expr2; break;
      case 3:       expr0=expr1>>expr2; break;
    }
    if        op&0x08==0x08    mem=expr0;
    else                       reg[ctr]=expr0;
  }
  else if   opb45==0x00 {
    if        op&0x04==0x04 {
      if        opb67==0x00 expr2=0;
      switch    (op&0x03) {
        case 0:       if reg[ctr]==expr2 { expr0=expr1; flag==1;
                                           break; }
        case 1:       if reg[ctr]<expr2  { expr0=expr1; flag==1;
                                           break; }
        case 2:       if mem==expr2      { expr0=expr1; flag==1;
                                           break; }
        case 3:       if mem<expr2       { expr0=expr1;
                                           flag==1; break; }
      }
      if flag==1 {
        if        op&0x08==0x08    mem=expr0;
        else                       reg[ctr]=expr0;
      }
    }
    else if   opb67!=0x00 {
      if        op&0x02 {
        if        op&0x01          mem=expr2;
        else                       mem=-expr2;
      }
      else {
        if        op&0x01          reg[ctr]=expr2;
        else                       reg[ctr]=-expr2;
      }
      if        op&0x0a==0x02    reg[ctr]=mem;
      else if   op&0x0a==0x08    mem=reg[ctr];
    }
    else {
      switch    (op&0x0b) {
        case 1:       reg[ctr]=mem; break;
        case 2:       reg[ctr]=(reg[ctr]<<1)>>1; break;
        case 3:       reg[ctr]=(mem<<1)>>1; break;
        case 9:       mem=mem; break;
        case 10:      mem=(reg[ctr]<<1)>>1; break;
        case 11:      mem=(mem<<1)>>1; break;
      }
    }
  }
  else if   op&0xf0==0x20 {
    switch    (op&0x07) {
      case 0:       expr0=0; break;
      case 1:       expr0=1; break;
      case 4:       expr0=ctr_tot; break;
      case 5:       expr0=ctr_mem; break;
    }
    if        op&0x08==0x08    mem=expr0;
    else                       reg[ctr]=expr0;
  }
  else {
  }
}
```

By way of example, the structure of some commands which can be used in embodiments of the present invention are shown in the table below:

| Operation | Operd2 | type | Operd1 | type | Result | Opclass | Optype | result | 1st operand | | 2nd operand | |
|---|---|---|---|---|---|---|---|---|---|---|---|---|
| 0  | 0 | 0 | 0 | 0 | 0 | 0 | 0 | 0 | reg | = reg | | |
| 1  | 0 | 0 | 0 | 0 | 0 | 0 | 0 | 1 | reg | = mem | | |
| 2  | 0 | 0 | 0 | 0 | 0 | 0 | 1 | 0 | reg | = reg<<1; reg | >> | 1 |
| 3  | 0 | 0 | 0 | 0 | 0 | 0 | 1 | 1 | reg | = mem<<1; mem | >> | 1 |
| 4  | 0 | 0 | 0 | 0 | 0 | 1 | 0 | 0 | reg | = mem if reg | == | 0 |
| 5  | 0 | 0 | 0 | 0 | 0 | 1 | 0 | 1 | reg | = mem if reg | > | 0 |
| 6  | 0 | 0 | 0 | 0 | 0 | 1 | 1 | 0 | reg | = mem if mem | == | 0 |
| 7  | 0 | 0 | 0 | 0 | 0 | 1 | 1 | 1 | reg | = mem if mem | > | 0 |
| 8  | 0 | 0 | 0 | 0 | 1 | 0 | 0 | 0 | mem | = reg | | |
| 9  | 0 | 0 | 0 | 0 | 1 | 0 | 0 | 1 | mem | = | | |
| 10 | 0 | 0 | 0 | 0 | 1 | 0 | 1 | 0 | mem | = reg<<1; reg | >> | 1 |
| 11 | 0 | 0 | 0 | 0 | 1 | 0 | 1 | 1 | mem | = mem<<1; mem | >> | 1 |
| 12 | 0 | 0 | 0 | 0 | 1 | 1 | 0 | 0 | mem | = reg if reg | == | 0 |
| 13 | 0 | 0 | 0 | 0 | 1 | 1 | 0 | 1 | mem | = reg if reg | > | 0 |
| 14 | 0 | 0 | 0 | 0 | 1 | 1 | 1 | 0 | mem | = reg if mem | == | 0 |
| 15 | 0 | 0 | 0 | 0 | 1 | 1 | 1 | 1 | mem | = reg if mem | > | 0 |
| 16 | 0 | 0 | 0 | 1 | 0 | 0 | 0 | 0 | reg | = reg | + | 1 |
| 17 | 0 | 0 | 0 | 1 | 0 | 0 | 0 | 1 | reg | = reg | − | 1 |
| 18 | 0 | 0 | 0 | 1 | 0 | 0 | 1 | 0 | reg | = reg | << | 1 |
| 19 | 0 | 0 | 0 | 1 | 0 | 0 | 1 | 1 | reg | = reg | >> | 1 |
| 20 | 0 | 0 | 0 | 1 | 0 | 1 | 0 | 0 | reg | = mem | + | 1 |
| 21 | 0 | 0 | 0 | 1 | 0 | 1 | 0 | 1 | reg | = mem | − | 1 |
| 22 | 0 | 0 | 0 | 1 | 0 | 1 | 1 | 0 | reg | = mem | << | 1 |
| 23 | 0 | 0 | 0 | 1 | 0 | 1 | 1 | 1 | reg | = mem | >> | 1 |

The invention has been described above for 8 bit architectures in order to be usable even for low performance devices, but it can be optimized for other architectures as necessary.

Although the present invention has been described above with reference to specific embodiments, it will be appreciated by a skilled person that many modifications and variations are possible within the scope of the appended claims.

Although in the appended claims the dependent claims may refer only to an independent claim on which they depend, embodiments of the present invention may encompass any combination of features disclosed in the claims. In particular, embodiments of the present invention may comprise features from any two or more dependant claims in combination with an independent claim on which they depend.

What is claimed is:

1. A method comprising:
   storing in a device a static policy framework and one or more dynamic policy algorithms;
   controlling policy management in the device by operating the static policy framework and executing one or more of the dynamic policy algorithms;
   where the dynamic policy algorithms are stored in memory as a structure of commands which operate on registers, further comprising,
   reading input values provided by the static policy framework to the registers before execution of a dynamic policy algorithm; and
   writing output values from the registers to the static policy framework after execution of the dynamic policy algorithm.

2. A method according to claim 1, wherein the device comprises a mobile terminal.

3. A method according to claim 2, wherein the device comprises a multi-access mobile terminal.

4. A method according to claim 1, further comprising: modifying each of the dynamic policy algorithms by two or more policy owners.

5. A method according to claim 1, wherein each of the dynamic policy algorithms has a static set of inputs obtained from the registers and a static set of outputs provided to the registers.

6. A method according to claim 1, wherein the structure comprises a table of values and an operation is performed on each register in turn in a single pass.

7. A method according to claim 1, wherein the structure comprises a list of commands, each command being preceded by a pointer to a register on which an operation is to be performed.

8. A method according to claim 1, wherein the structure comprises a table structure and a list structure, and a toggling command switches a mode of operation of the algorithm between a table mode and a list mode.

9. A method according to claim 1, further comprising:
   checking that the input values provided by the static policy framework are within a parameter range defined in a configured policy.

10. A method according to claim 1, further comprising:
    checking that the output values to be written to the static policy framework are within a range defined in a configured policy.

11. A method according to claim 1, wherein each of the commands comprises an argument field.

12. A method according to claim 1, wherein the static policy framework comprises a plurality of specific policy algorithms for controlling policy management.

13. A method according to claim 1, further comprising:
    storing the dynamic policy algorithms in the device using a text editor.

14. A method according to claim 1, further comprising:
    checking that the dynamic policy algorithms stored in the device are compatible with the static policy framework.

15. A method according to claim 1, further comprising:
    verifying that the dynamic policy algorithms stored in the device were entered by an authorised policy creator.

16. A method according to claim 1, further comprising:
transmitting the stored dynamic policy algorithms to a remote device.

17. A method according to claim 3, further comprising: associating at least one of the dynamic policy algorithms with a policy controlling connectivity of the device to different networks.

18. A method according to claim 1, further comprising: executing the dynamic policy algorithms using an interpreter.

19. A method according to claim 1, further comprising:
selecting as an active algorithm a dynamic policy algorithm from among the dynamic policy algorithms stored in the device, and executing the active algorithm.

20. A method according to claim 1, further comprising:
selecting a plurality of the dynamic policy algorithms as active algorithms, and further selecting one of the active algorithms for execution.

21. A method according to claim 20, further comprising:
selecting a dynamic policy algorithm from among the active algorithms for execution according to one or more of a user of the device, an administrator of the device, and application to be operated by the device.

22. An apparatus comprising:
a memory for storing a static policy framework and one or more dynamic policy algorithms; and
a processor;
wherein the processor is configured to control policy management in the apparatus by operating the static policy framework and executing one or more of the dynamic policy algorithms,
where the dynamic policy algorithms are stored in the memory as a structure of commands which operate on registers, and where said processor is further configured to,
read input values provided by the static policy framework to the registers before execution of a dynamic policy algorithm; and
write output values from the registers to the static policy framework after execution of the dynamic policy algorithm.

23. An apparatus according to claim 22, further comprising:
an input device for entering or modifying the dynamic policy algorithms.

24. An apparatus according to claim 22, wherein the processor is configured to operate an algorithm manager for regulating input and storage of the dynamic policy algorithms in the memory.

25. An apparatus according to claim 22, wherein the processor is configured to operate an algorithm interpreter for reading and executing the dynamic policy algorithms.

26. An apparatus according to claim 22, wherein the apparatus is a multi-access mobile terminal.

27. An apparatus comprising:
storage means for storing data representing a static policy framework and one or more dynamic policy algorithms; and
policy management means connected with said storage means for processing the data for controlling policy management in said apparatus by operating the static policy framework and executing one or more of the dynamic policy algorithms,
where the dynamic policy algorithms are stored in said storage means as a structure of commands which operate on registers, and where
said policy management means reads input values provided by the static policy framework to the registers before execution of a dynamic policy algorithm and writes output values from the registers to the static policy framework after execution of the dynamic policy algorithm.

28. An apparatus according to claim 27, wherein the policy management means comprises processor means.

29. An apparatus according to claim 27, further comprising;
input means connected with said storage means for entering or modifying the dynamic policy algorithms.

30. An apparatus according to claim 27, wherein the policy management means comprises an algorithm management means for regulating input and storage of the dynamic policy algorithms in the storage means, and an algorithm interpretation means for reading and executing the dynamic policy algorithms.

31. A non-transitory computer-readable medium that stores a computer program comprising a set of instructions which when executed on a processor in a device, causes the processor to operate a static policy framework and one or more dynamic policy algorithms for controlling policy management in the device,
where the dynamic policy algorithms are stored as a structure of commands which operate on registers,
and where the processor is further caused to read input values provided by the static policy framework to the registers before execution of a dynamic policy algorithm and write output values from the registers to the static policy framework after execution of the dynamic policy algorithm.

32. A non-transitory computer-readable medium as in claim 31, where the device is embodied as a multi-access mobile terminal, and where the processor is further caused to associate at least one of the dynamic policy algorithms with a policy controlling connectivity of the multi-access mobile terminal to different networks.

33. A non-transitory computer-readable medium as in claim 31, where execution of a toggling command switches a mode of operation between a command table mode and a command list mode.

34. A non-transitory computer-readable medium as in claim 31, where the processor is further caused to execute commands of a dynamic policy algorithm by use of a command interpreter.

* * * * *